Sept. 17, 1929.  C. M. PURDY  1,728,700
HEN'S NEST
Filed March 21, 1928  2 Sheets-Sheet 1
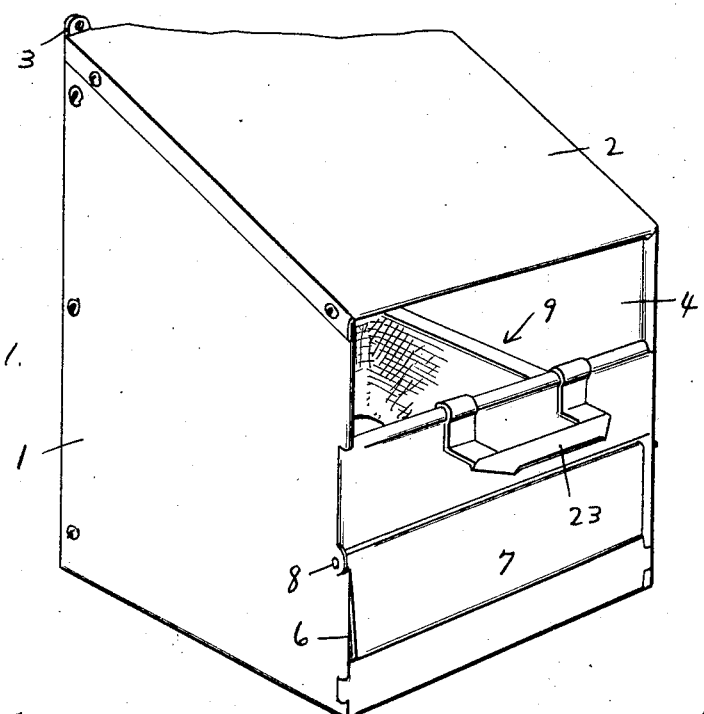
Fig. 1.
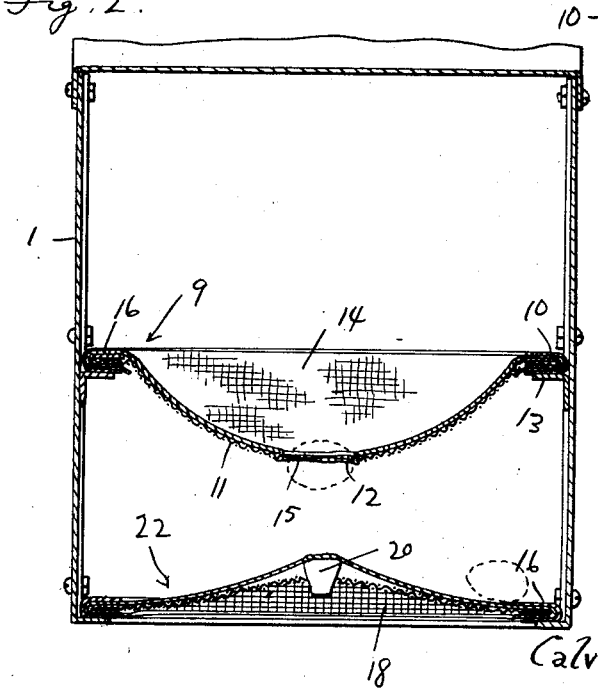
Fig. 2.
Fig. 7.
Inventor
Calvin M. Purdy
By Clarence A. O'Brien
Attorney Sept. 17, 1929.　　　C. M. PURDY　　　1,728,700
HEN'S NEST
Filed March 21, 1928　　　2 Sheets-Sheet 2
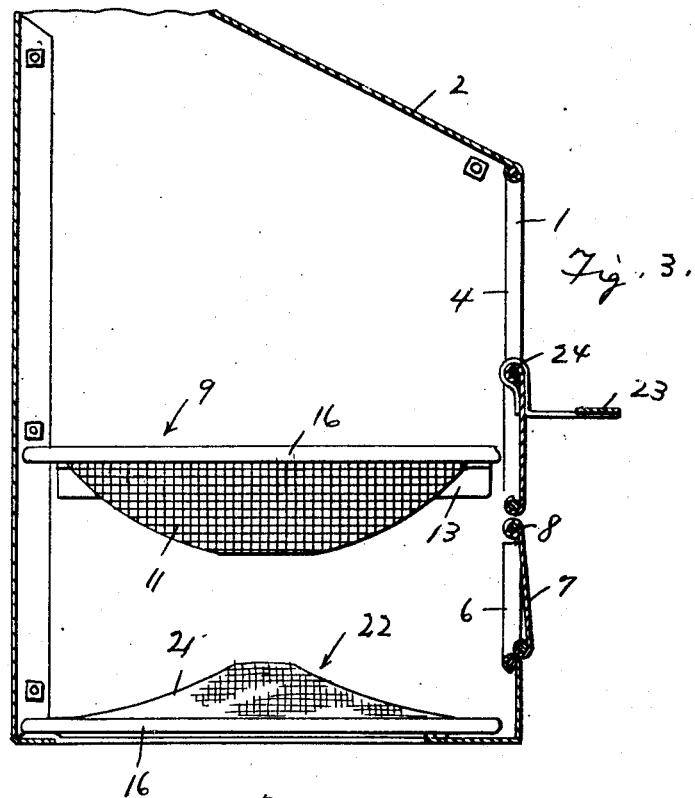
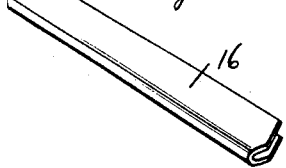
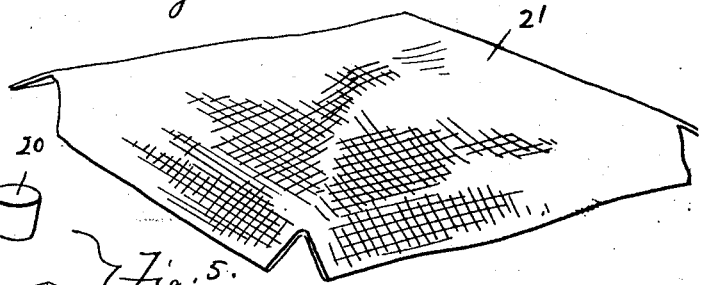
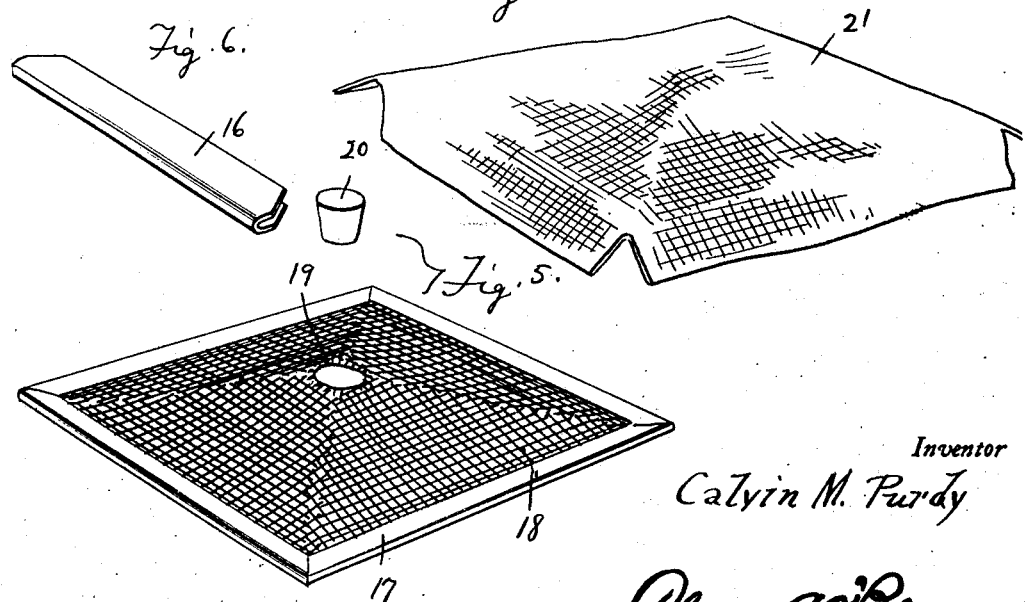
Inventor
Calvin M. Purdy
By Clarence A. O'Brien
Attorney Patented Sept. 17, 1929

1,728,700

UNITED STATES PATENT OFFICE

CALVIN M. PURDY, OF FREDERICKSTOWN, OHIO

HEN'S NEST

Application filed March 21, 1928. Serial No. 263,296.

The present invention relates to improvements in nests for hens and has for its principal object to provide a nest construction whereby the eggs laid by the hens will drop into the bottom of the nest so that access thereto by the hens is impossible.

Another important object of the invention is to provide a hen's nest wherein the eggs may be kept in a clean condition, means being provided for association with the bottom forming unit whereby the eggs will be caused to roll to the side of the nest thus preventing breakage of the eggs.

A still further object is to provide a hen's nest that includes a removable burlap covering for both the nest and the egg receiving member, means being provided for detachably securing the covering so that the same can be readily replaced with a clean one whenever necessary.

A further object is to provide a hen's nest of the above mentioned character which is simple in construction, inexpensive, strong and durable and further well adapted to the purpose for which it is designed.

Other objects and advantages of the invention will become apparent from the following description when taken in connection with the accompanying drawings.

In the accompanying drawings wherein like reference characters indicate like parts throughout the same:

Figure 1 is a fragmentary perspective view of the hen's nest embodying my invention.

Figure 2 is a vertical sectional view therethrough.

Figure 3 is a similar section taken at right angles with respect to Figure 2, parts of the invention being shown in elevation.

Figure 4 is a detail perspective view of the burlap covering for the bottom forming unit.

Figure 5 is a group perspective of the bottom forming unit, and the cork plug fitted in the opening provided therefor in said unit.

Figure 6 is a detail perspective view of one of the removable clamping members for retaining the burlap covering in position on the frame of each of the members arranged in the casing, and Figure 7 is a top plan view of the nest unit.

In the drawings wherein for the purpose of illustration is shown the preferred embodiment of my invention, the numeral 1 designates a metallic casing that is of substantially rectangular configuration, the top 2 being disposed at an incline for the purpose of preventing the fowl roosting thereon, the bottom of the casing is open for the major portion thereof and suitable attaching brackets 3 are provided at the rear of the casing for securing the same on a wall in any appropriate manner. The front side of the casing is open at the upper portion thereof to provide an entrance or exit for the hens. The front side of the casing is furthermore formed with an opening 6 in the lower portion thereof to permit a person to gain access to the bottom portion of the casing for removing the eggs. This opening 6 is normally closed by a vertically swinging cover or door 7 that is hinged at its upper edge as at 8. The lower edge of the door is preferably rolled so that the person placing his hand in the casing will not come in contact with any sharp edges and also the lower edge of the door opening 6 is rolled, and this feature is clearly shown in Figure 3 of the drawings.

Supported in the casing 1 below the opening 4 is the nest designated generally by the numeral 9, the same comprising a rectangular frame 10 around the sides of which are secured in any appropriate manner the upper edges of the basket 11 formed of wire mesh material, the bottom of the basket being rounded and being formed with a central egg discharge opening 12 in the manner as clearly shown in Figure 7.

The nest 9 is adapted to be removably supported on the shelves 13 that are secured to the inner faces of the respective sides of the casing 1.

A burlap covering 14 is provided for the upper side of the wire basket 11, and the frame 10 of the nest 9, the central portion of this covering formed with an opening 15 to register with the opening 12 formed in the central portion of the wire basket 11, and U-shaped clamping members such as are shown at 16 are slidably and removably disposed over the respective sides of the rectangular frame 10 to secure the burlap covering in proper position.

The invention further comprehends the provision of the bottom forming unit designated generally by the numeral 22 and this unit includes a rectangular frame 17 covered with a wire mesh material 18 and as is clearly shown in Figure 5, the central portion of the wire mesh material 18 is raised and the sides taper gradually from the center to the respective sides of the frame whereby a pyramidal shaped structure is provided and an opening 19 is formed at the apex portion of the pyramidal shaped screen covering 18 which is disposed in direct alinement with the egg discharge opening 12 formed in the basket 11 of the nest 9.

A cork stopper 20 is fitted at its lower end in this opening 19 and the purpose of this stopper is to provide a cushioning means for the eggs as the same are discharged from the nest so that the eggs will not be broken.

A burlap covering 21 is provided for the lower unit 22, and the manner in which this burlap covering is disposed over the unit 22 is clearly shown in Figure 2. The side edges of the burlap covering are secured over the respective side edges of the frame 17 by additional U-shaped clamping members 16.

A perch 23 is disposed on the front side of the casing 1 and the same is formed with resilient clamping members 24 for detachable engagement over the lower rolled edge of the opening 4 as shown very clearly in Figure 3 of the drawings.

The use of my improved nest is thought to be readily obvious from the construction disclosed and it will be apparent that when the eggs are discharged through the opening 12, the same will fall into the lower portion of the casing and will strike the cork stopper 20 and due to the shape of the screen 18 the eggs will be caused to roll to the side of the casing so that the next egg may be properly discharged into the bottom of the casing. The eggs may be removed from the lower portion of the casing by swinging the door 7 upwardly and placing the hand through the opening 6.

The burlap covering is provided for the top and the bottom forming unit can be readily and easily removed and replaced with new coverings whenever necessary, thus promoting sanitation.

A hen's nest of the above mentioned character will prevent any possibility of the hens gaining access to the eggs and furthermore the eggs will be kept in a clean condition.

A structure of the above mentioned character will be strong and durable and can furthermore be manufactured at a very low cost.

While I have shown the preferred embodiment of my invention, it is to be understood that various changes in the size, shape and arrangement of parts may be resorted to without departing from the spirit of the invention and the scope of the appended claims.

Having thus described the invention, what I claim is:—

1. In a hen's nest of the class described, a casing provided with an entrance and exit opening in one side thereof, a nest supported in the casing below the opening, said nest being formed with an egg discharge opening in the central portion thereof, a frame supported below the nest, a pyramidal shaped screen mounted on the frame, the apex portion of said pyramidal shaped screen being formed with an opening for disposition in alinement with the discharge opening in the nest, a cushioning member fitted at its lower end in said opening and upon which member the eggs fall when discharged from the nest, a covering for the pyramidal shaped screen and the cushioning member, the projecting portion of the cushioning member spacing the adjacent portion of the covering from the screen, said casing being provided with a covered opening to permit the removal of the eggs.

2. In a hen's nest of the class described, a casing provided with an entrance and an exit opening in one side thereof, a nest supported in the casing below the opening and being formed with an egg discharge opening in the central portion thereof, a lining for the nest formed with a central opening for registration with the aforementioned opening, a frame supported below the nest, a screen mounted on the frame, the central portion of the screen being raised and formed with an opening for disposition below and in alinement with the opening in the nest, a cushioning member having its lower end portion fitted in the opening in said screen, upon which the eggs fall when discharged from the nest, a covering for the screen and the cushioning member, a projecting portion of the cushioning member spacing the adjacent portion of the covering from the screen, and separable clamping members for detachably securing the lining and covering on the nest and frame respectively.

In testimony whereof I affix my signature.

CALVIN M. PURDY.